June 23, 1931.  W. C. ELLIXSON  1,811,717
WINDSHIELD WIPER
Filed June 6, 1930
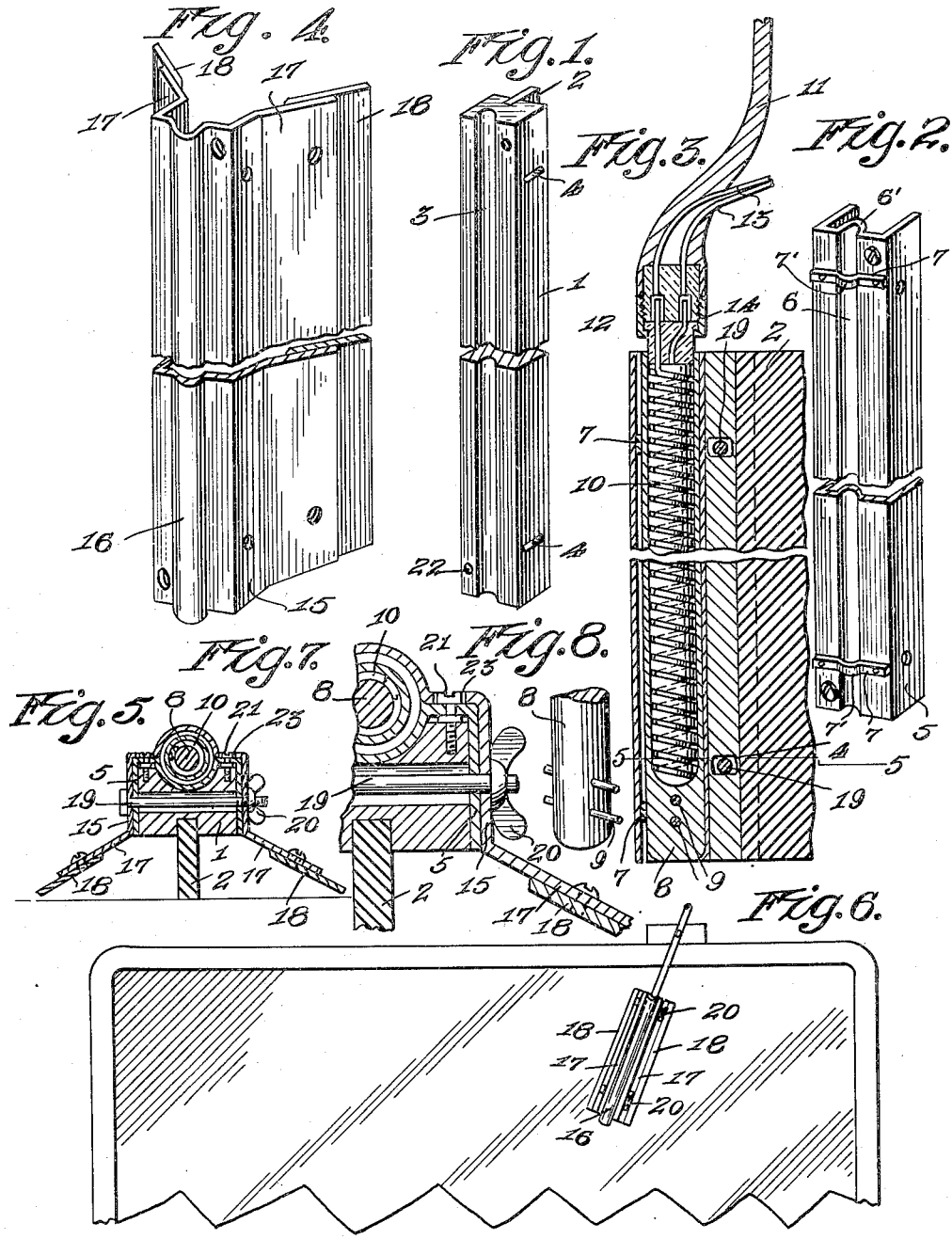
William C. Ellixson, INVENTOR
BY Victor J. Evans, ATTORNEY Patented June 23, 1931

1,811,717

UNITED STATES PATENT OFFICE

WILLIAM C. ELLIXSON, OF JACKSON, MICHIGAN

WINDSHIELD WIPER

Application filed June 6, 1930. Serial No. 459,543.

This invention relates to a windshield wiper, the general object of the invention being to provide the wiper with scraper blades for removing snow and ice from the windshield, with means for heating the parts so as to melt the snow and ice and prevent the same from adhering to the scraper blades.

A further object of the invention is to provide means whereby the member which carries the wiper strip can be adjusted to properly position the strip in relation to the windshield without bending the arm which connects the wiper device with its actuating means.

A still further object of the invention is to provide means whereby the member which carries the scraper blades can be removed when such blades are not required, such as in warm weather or where there is no possibility of snow or ice collecting on the windshield.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a perspective view of the member which carries the wiper strip.

Figure 2 is a similar view of the housing for said member.

Figure 3 is a longitudinal sectional view through the complete device and showing the same connected with the depending arm.

Figure 4 is a view of the member which carries the scraper blades.

Figure 5 is a section on line 5—5 of Figure 3.

Figure 6 is a view of a windshield, showing the device thereon.

Figure 7 is an enlarged transverse sectional view showing the means for adjusting the strip carrying member.

Figure 8 is a view of the rear part of the tube which carries the heating coil and showing the pins thereon for engaging one of the cross straps on the housing shown in Figure 2.

In these drawings, the numeral 1 indicates a block of elongated shape which carries the wiper strip 2. This block is formed with a longitudinally extending groove 3 in that face which is opposite the face which carries the strip and slots 4 pass through the block from one side to the other. A channel shaped housing or member 5 fits over the block and has a longitudinally extending groove 6 therein, the part 6' which forms the groove fitting in the groove 3 of the block. Cross straps 7 are fastened to the bight of the member 5 and extend across the groove 6 and these straps are curved outwardly, as shown at 7', where they cross the groove. A tube 8 is placed in the groove 6 and passes under the straps 7 and a pair of pins 9 pass through the lower part of the tube, with one pin passing under the lower strap 7 and the other over said strap so that these pins hold the tube in the groove 6. This tube carries the heating coil 10 and the upper end of the tube is connected to the arm 11 which has its upper end connected with the actuating means of the device. The connection between the arm and tube is a detachable one, as shown generally at 12, and the connection between the conductors 13 and the ends of the coil is made in the form of the usual plug and socket, as shown generally at 14. An outer channel shaped member 15 is adapted to be placed over the member 5 and the bight of this member 15 is formed with an internal groove 16 for receiving a part of the tube 8 and said member 15 is formed with the flaring parts 17 on its flanges to which are fastened by screws or the like the scraper blades 18. Bolts 19 pass through holes in the flaring parts 17 of the member 15 and through holes in the flanges of the member 5 and through the slots 4, the bolts being provided with the wing nuts 20 so that by tightening these nuts, the parts are held in assembled position. Screws 21 are swiveled in the bight of the member 5 and have their threaded portions engaging threaded holes 22 in the block, with the heads of the screws fitting in openings 23 in the bight of the member 15. Thus by turning these screws, the block can be moved toward and away from the windshield so as to adjust the wiper strip 2 with respect to the transparent member of the windshield.

From the foregoing it will be seen that the friction of the wiper strip on the transparent member will cause the parts to rock so that the scraper blades 18 will engage the transparent member, one blade engaging the member when the device is moving in one direction and the other blade engaging the member when the device is moving in the opposite direction. Thus the blades 18 will scrape snow and ice from the windshield and as the parts are heated by the coil 10, snow and ice will be melted from the windshield and the blades will be heated so that the snow and ice cannot adhere thereto.

Whenever desired, the housing 15 and the blades can be removed from the device so that the device can be used without the scraper blades, such as in the summer time or when there is no danger of ice and snow collecting on the windshield.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A windshield wiper comprising a block, a wiper strip carried thereby, a channel shaped member in which the block fits, means for adjusting the block to cause the strip to properly contact the windshield, an outer channel shaped member having flaring flanges and in which the first channel shaped member fits, scraper blades attached to the flaring flanges, a heating element arranged between the outer channel shaped member and the first channel shaped member for heating the scraper blades and means whereby the outer member can be detached from the other parts.

2. A windshield wiper comprising a block, a wiper strip carried thereby, said block having a groove in that face which is opposite the face which carries the strip, a channel shaped member in which the block fits, said channel shaped member having a groove in its bight, a tube passing through the groove, cross strips fastened to the bight of the channel shaped member and extending over the tube, a heating element carried by the tube, means for adjusting the block in the channel shaped member whereby the strip can be readily adjusted with respect to the windshield, a second channel shaped member receiving the first member and having a groove therein for receiving the tube and said second channel shaped member having flaring flanges, scraper blades connected with said flanges, means for connecting the upper end of the tube to a supporting arm and means for electrically connecting the heating medium to a source of electrical supply.

3. A windshield wiper comprising a block, a wiper strip carried thereby, said block having a groove in that face which is opposite the face which carries the strip, a channel shaped member in which the block fits, said channel shaped member having a groove in its bight, a tube passing through the groove, cross strips fastened to the bight of the channel shaped member and extending over the tube, a heating element carried by the tube, means for adjusting the block in the channel shaped member whereby the strip can be readily adjusted with respect to the windshield, a second channel shaped member receiving the first member and having a groove therein for receiving the tube and said second channel shaped member having flaring flanges, scraper blades connected with said flanges, means for connecting the upper end of the tube to a supporting arm, means for electrically connecting the heating medium to a source of electrical supply and means for detachably connecting the outer channel shaped member to the other parts.

In testimony whereof I affix my signature.

WILLIAM C. ELLIXSON.